United States Patent

Nobuoka

[11] Patent Number: 5,926,216
[45] Date of Patent: *Jul. 20, 1999

[54] IMAGE SENSING APPARATUS

[75] Inventor: Kosuke Nobuoka, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/576,674

[22] Filed: Dec. 21, 1995

[30] Foreign Application Priority Data

Dec. 27, 1994 [JP] Japan .................................. 6-325090
Dec. 27, 1994 [JP] Japan .................................. 6-325092
Dec. 27, 1994 [JP] Japan .................................. 6-325128

[51] Int. Cl.[6] ............................ H04N 3/14; H04N 5/228
[52] U.S. Cl. ................................. 348/297; 348/208
[58] Field of Search .................... 348/207, 208, 348/294, 295, 297, 298, 299, 335, 340, 218, 219, 345, 296, 362, 363, 364, 229; H04N 5/225

[56] References Cited

U.S. PATENT DOCUMENTS

| | | | |
|---|---|---|---|
| 4,633,317 | 12/1986 | Uwira et al. | 348/219 |
| 5,107,293 | 4/1992 | Sekine et al. | 348/208 |
| 5,335,075 | 8/1994 | Komiya et al. | 348/298 |
| 5,402,171 | 3/1995 | Tagami et al. | 348/219 |
| 5,420,629 | 5/1995 | Watanabe | 348/297 |
| 5,512,950 | 4/1996 | Watanabe et al. | 348/297 |

Primary Examiner—Tuan V. Ho
Attorney, Agent, or Firm—Morgan & Finnegan, L.L.P.

[57] ABSTRACT

When a luminance level detector detects that a luminance level of an image signal which is photoelectric-converted by a CCD is smaller than a predetermined value, a gate is opened. Then, the image signal temporary stored in a memory is added with newly inputted signals by an adder until its level becomes greater or equal to the predetermined value. This operation is applied on an image each time when focusing position of the image is shifted to a different position on a photo-sensing surface of the CCD by a VAP. Thereafter, obtained image signals are read and processed in a signal processing circuit.

25 Claims, 5 Drawing Sheets

IMAGE SENSING APPARATUS

BACKGROUND OF THE INVENTION

The present invention relates to an image sensing apparatus for sensing an image of an object.

In a conventional image sensing apparatus which uses solid image sensing elements, such as CCD, arranged in two dimension, to output an image to be used by a printer or applied with image processing by a computer, the total number of pixel is less than that of an image sensing apparatus, such as a scanner, using image sensing elements arranged in one dimension. Accordingly, there is a problem that resolution of an obtained image is low, thus an output image of high quality can not be obtained. In order to overcome the above problem, a method in which an imaging position of an optical image on a photo-sensing surface of a solid image sensing element is shifted by half pixel in the vertical and horizontal directions so as to obtain four frames of the image, then they are read and processed into a single image thus obtaining an image of high resolution expressed by four times as many pixels as the image expressed by a single frame, has been developed.

For example, as for improving an apparent resolution of an image, the Japanese Patent Laid-Open No. 64-69160 discloses a method of shifting CCD in the horizontal and vertical directions by using a piezoelectric element, and the Japanese Patent Laid-Open No. 63-284979 discloses a method of changing the light path by using-an optical device provided between an image sensing lens system and CCD. Further, in the Japanese Patent Laid-Open No. 4-311448, a variable angle prism (VAP) is used as means for changing the light path.

According to the aforesaid signal processing method of the aforesaid image sensing apparatus, the apparent resolution improves, however, the following problem remains. Namely, the maximum dynamic range of luminance change in the nature is about 100,000 luxes, whereas there is a limitation in the range of luminance change that a solid image sensing element, such as CCD, can reproduce.

Accordingly, in a conventional video camera or the like, the intensity of light which illuminates a solid image sensing element is controlled by using an iris diaphragm provided in front of the solid image sensing element. Further, in a case where the intensity of incoming light is not enough and the output signal level does not reach a predetermined value even when the iris diaphragm is completely opened, the signal level is amplified by an automatic gain control circuit.

However, in the aforesaid conventional image sensing apparatus, in a case where the output from an image sensing element is amplified by a large gain when the object is not illuminated enough, noises are also amplified accordingly, which deteriorates S/N ratio of an obtained image signal. Therefore, the processed image could not have high quality.

There is a conventional method often used against the aforesaid problem, which makes reading speed of a solid image sensing element slower so that the solid image sensing element can be charged enough even when luminance of an object is not satisfactory. However, noises occurred in a solid image sensing element of CCD or the like increase as an amount of charge increases, thus the S/N ratio does not improve as desired.

Furthermore, if the intensity of light which illuminates an object changes while sensing four frames of a still image, values of corresponding pixels in the four frames differ when the four frames are processed. The difference becomes a carrier component which deteriorates image quality.

SUMMARY OF THE INVENTION

The present invention has been made in consideration of the above situation, and has as its object to provide an image sensing apparatus capable of sensing an image with high S/N ratio.

According to the present invention, the foregoing object is attained by providing an image sensing apparatus which outputs an image signal, comprising: optical focusing system for focusing the optical image on a photo-sensing surface; photoelectric conversion means for photoelectrically converting the optical image focused on the photo-sensing surface so as to generate an electric signal; integration means for integrating the electric signal with respect to time; integration control means for controlling an operation of integration performed by the integration means; and output means for generating the image signal on the basis of the integrated electric signal and outputting it.

According to an aspect of the present invention as described above, the integration control means controls the integration means to continue integrating the electric signal until the integrated electric signal reaches a predetermined level.

Further, according to another aspect of the present invention as described above, the integration control means controls the integration means to continue integrating the electric signal until a luminance level of an integrated electric signal reaches a predetermined level.

Furthermore, according to still another aspect of the present invention as described above, the image sensing apparatus further comprises imaging position shifting means for sequentially focusing a plurality of positions of the optical image on the photo-sensing surface, wherein the photo-electric conversion means generates an electric signal of the optical image focused on each of the plurality of imaging positions.

Further, according to still another aspect of the present invention as described above, the image sensing apparatus further comprises: storage means for storing integrated electric signals, integrated by the integration means, each of which corresponding to the plurality of positions of an optical image focused on the photo-sensing surface; and processing means for reading out and processing the electric signals stored in the storage means.

Further, according to still another aspect of the present invention as described above, the photoelectric conversion means comprises a charge-coupled device.

Further, according to still another aspect of the present invention as described above, the imaging position shifting means comprises a variable angle prism.

Further, according to still another aspect of the present invention as described above, the image sensing apparatus further comprises operation means for dividing a value of the integrated electric signal by a predetermined number.

Further, according to still another aspect of the present invention as described above, the integration means adds electric signals a predetermined number of times.

Further, according to still another aspect of the present invention as described above, the operation means divides a value of an integrated electric signal by the predetermined number.

Further, according to still another aspect of the present invention as described above, the image sensing apparatus further comprises amplifying means for amplifying an electric signal, generated by performing photoelectric conversion, to a predetermined level, wherein the integration means integrates an electric signal amplified by the amplifying means.

It is another object of the present invention is to provide an image sensing apparatus which outputs an image signal, comprising: optical focusing system for focusing the optical image on a photo-sensing surface; photoelectric conversion means for photoelectrically converting the optical image focused on the photo-sensing surface so as to generate an electric signal; integration means for integrating the electric signal with respect to time; integration control means for controlling the integration means to continue integrating the electric signal until an integrated electric signal reaches a predetermined level; and output means for generating the image signal on the basis of the integrated electric signal and outputting it.

It is still another object of the present invention is to provide an image sensing apparatus which outputs an image signal, comprising: optical focusing system for focusing the optical image on a photo-sensing surface; photoelectric conversion means for photoelectrically converting the optical image focused on the photo-sensing surface so as to generate an electric signal; integration means for integrating the electric signal with respect to time; operation means for dividing a value of the integrated electric signal by a predetermined number; and output means for generating the image signal on the basis of the divided electric signal obtained by the operation means and outputting it.

It is still another object of the present invention to provide an image sensing apparatus capable of sensing a high quality still image even in a case where intensity of light changes while sensing an image of an object. According to the present invention, the foregoing object is attained by providing an image sensing apparatus which outputs an image signal, comprising: optical focusing system for focusing the optical image on a photo-sensing surface; imaging position shifting means for sequentially focusing the optical image at a plurality of positions on the photo-sensing surface; photoelectric conversion means for photoelectrically converting an optical image focused at each of the plurality of positions on the photo-sensing surface so as to generate an electric signal; storage means for storing image signals generated by performing photoelectric conversion; calculation means for calculating an average signal level of image signals generated by performing photoelectric conversion; control means for controlling a signal level of each image signal stored in the storage means on the basis of the calculated average signal level corresponding to the image signal; and processing means for reading out and processing image signals whose levels are controlled by the control means.

According to an aspect of the present invention as described above, the signal level is a luminance level.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
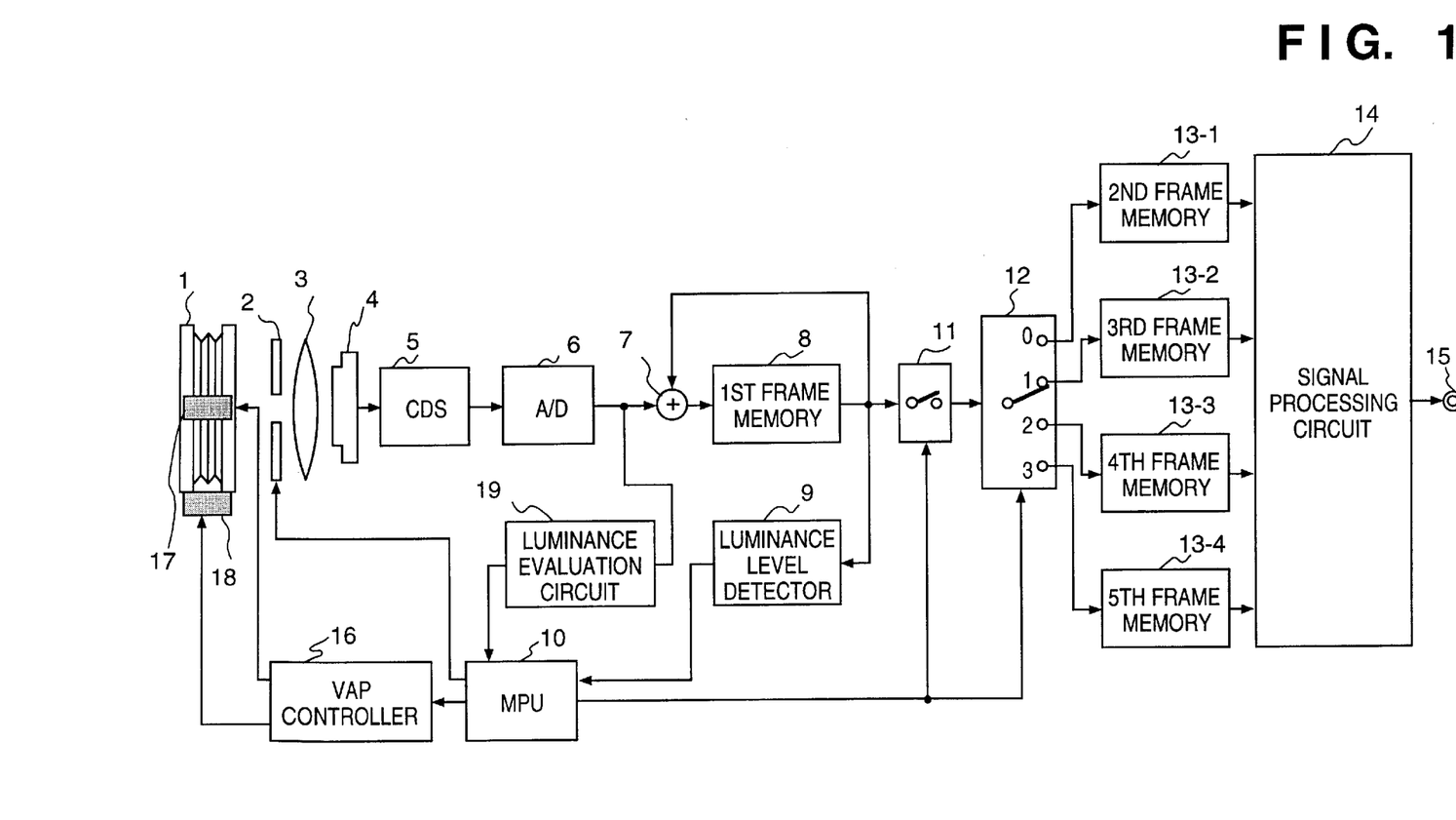
FIG. 1 is a block diagram illustrating a configuration of an image sensing apparatus according to a first embodiment.

FIG. 1 is a block diagram illustrating a configuration of an image sensing apparatus according to a first embodiment. In FIG. 1, reference numeral 1 denotes a variable angle prism (VAP) as means for shifting an imaging position; 2, an iris diaphragm; 3, a focusing lens system as an optical focusing system; 4, a charge-coupled device (CCD) as a photoelectric converter; 5, a correlated double sampling (CDS) circuit; and 6, an A/D converter.

Further, reference numeral 7 denotes an adder; 8, a first frame memory; 9, a luminance level detector as detecting means; 10, an MPU as control means; 11, a gate circuit; and 12, a switch.

Furthermore, reference numeral 13-1 denotes a second frame memory; 13-2, a third frame memory; 13-3, a fourth frame memory; and 13-4 a fifth frame memory. These frame memories 13-1 to 13-4 constitute storage means.

Reference numeral 14 denotes a signal processing circuit; 15, an output terminal; 16, a VAP controller; 17, a horizontal VAP actuator; 18, a vertical VAP actuator; and 19, a luminance evaluation circuit.

Figure 2:
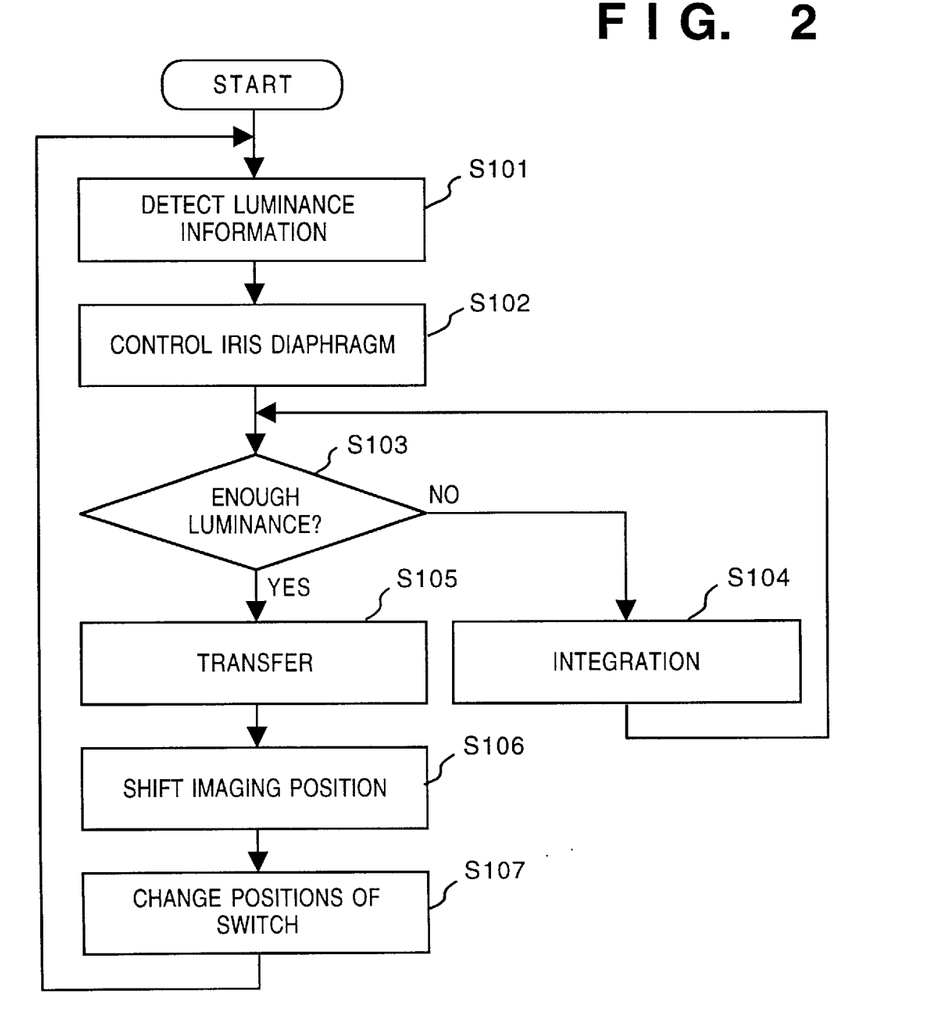
FIG. 2 is a flowchart showing a flow of a control by a microprocessing unit (MPU) according to the first embodiment.

Next, referring to FIGS. 1 and 2, an operation of the image sensing apparatus of the first embodiment will be explained. FIG. 2 is a flowchart showing a flow of the control by an MPU. An optical image which is focused on a photo-sensing surface of the CCD 4 through the VAP 1, the iris diaphragm 2, and the focusing lens system 3 is photoelectric-converted. Thereafter, noises of the converted signal is removed by the correlated double sampling circuit 5, then the signal is converted into a digital signal by the A/D converter 6. In the luminance evaluation circuit 19, luminance information of the optical image incidented on the CCD 4 is detected from the digital signal (step S101), then the luminance information is transferred to the MPU 10. The MPU 10 controls the iris diaphragm 2 by using the luminance information (step S102). When the intensity of light which incidents on the CCD 4 is too much, which causes the output signal from the CCD 4 saturated, for example, the intensity of incoming light is properly controlled by the iris diaphragm 2.

The signal outputted from the CCD 4 and converted into a digital signal by the A/D converter 6 is temporally stored in the first frame memory 8 via the adder 7. Then the image data stored in the memory 8 is transferred to the switch 12 through the gate circuit 11.

The luminance level detector 9 detects the luminance level of the image data and if the detected luminance level of the image data which is stored in the first frame memory 8 is less than a predetermined value because the intensity of incoming light is small (NO at step S103), the MPU 10 opens the gate circuit 11 so as to prevent a signal from being transmitted to the switch 12 and its downstream. In this case, the image data stored in the first frame memory 8 is fed back to the adder 7 where the image data is added with a newly inputted signal, then the added signal is stored in the first frame memory 8 (step S104). In other words, the adder 7 and the frame memory 8 serve to integrate signals outputted from the CCD 4 with respect to time.

The aforesaid integrating process is repeated until the luminance level detector 9 detects that the luminance level of the image signal stored in the first frame memory 8 is greater or equal to the predetermined value (YES at step S103), then the gate circuit 11 is closed so as to transfer the integrated image signal to the switch 12.

Meanwhile, the VAP controller 16 shifts the imaging position of an optical image on the photo-sensing surface of the CCD 4 to one of four positions on the basis of a command from the MPU 10 (step S106). These four positions are respectively a first position as a reference position, a second position which is shifted from the first position by half pixel in the horizontal direction, a third position which is shifted from the first position by half pixel both in the horizontal and vertical directions, and a fourth position which is shifted from the first position by half pixel in the vertical direction.

Further, the switch 12 has four output terminals, 0, 1, 2, and 3, connected to the memories 13-1 to 13-4, respectively, and it is controlled so as to switch to one of the four output terminals 0, 1, 2, and 3 in accordance with the aforesaid imaging position (step S107). The process of shifting the imaging position (S106) and the switching process (S107) are performed each time after the image signal stored in the first frame memory 8 is transmitted. In accordance with the aforesaid process for integration and the process of shifting the imaging position, S/N ratio of an image signal from the CCD 4 is improved by the integration process and sequentially stored in the four frame memories. Thereafter, the image signals stored in the four frame memories are read and processed by the signal processing circuit 14, and outputted from the output terminal 15.

In the first embodiment, the VAP is used as means to shifting the imaging position on the photo-sensing surface of the CCD, however, the present invention is not limited to this.

If it is assumed that the image sensing apparatus is sensing a still image, an optical image is stable regardless of elapse of time and correlation between image frames are almost 1. In contrast, noises occurred in a solid image sensing element, such as CCD, are random, and correlation among image frames is very low. Therefore, by constructing the image sensing apparatus according to the first embodiment, even when the object to be sensed is not illuminated enough, it is possible to sense an image of good S/N ratio, thereby providing a high quality still image. Further, since an automatic gain control device becomes unnecessary, the construction of the circuit can be simplified, thereby reducing a manufacturing cost.

Second Embodiment

Figure 3:
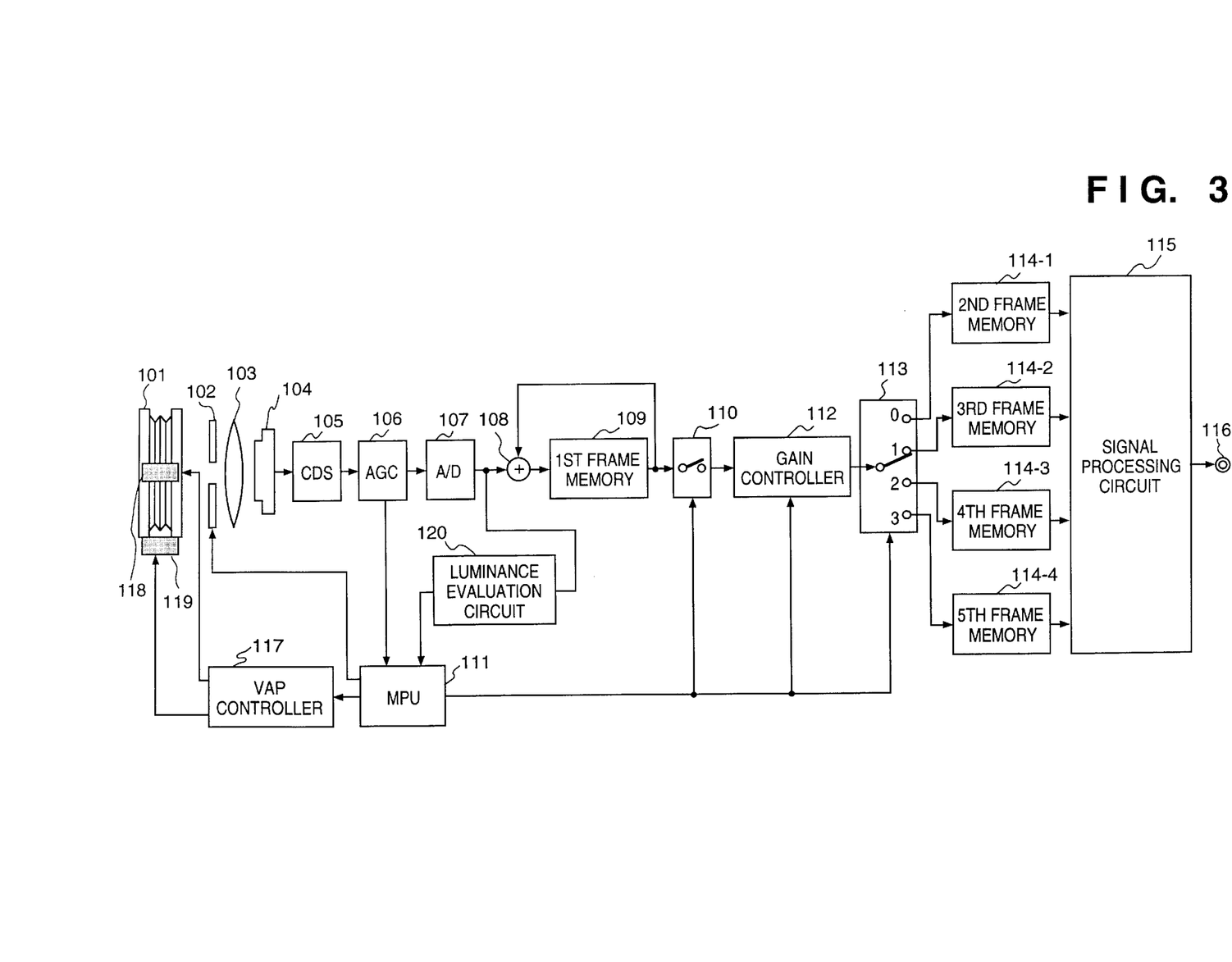
FIG. 3 is a block diagram illustrating a configuration of an image sensing apparatus according to a second embodiment.

FIG. 3 is a block diagram illustrating a configuration of an image sensing apparatus according to a second embodiment. In FIG. 3, reference numeral 101 denotes a variable angle prism (VAP) as means for shifting an imaging position; 102, an iris diaphragm; 103, a focusing lens system as an optical focusing system; 104, a charge-coupled device (CCD) as a photoelectric converter; 105, a correlated double sampling (CDS) circuit; 106, an automatic gain controller (AGC) as amplifying means; and 107, an A/D converter.

Further, reference numeral 108 denotes an adder; 109, a first frame memory; 110, a gate circuit; 111, an MPU; and 112, a gain controller. The adder 108, the first frame memory 109, the gate circuit 110, and the gain controller 112 provide adding and averaging means. As for the adding and averaging means, the adder 108 and the first frame memory 109 together function as an integrator for adding outputs from the A/D converter 107 a predetermined number of times, and the gain controller 112 functions as a divider which divides the integrated output by the predetermined number to obtain the average.

Furthermore, reference numeral 113 denotes a switch; 114-1 denotes a second frame memory; 114-2, a third frame memory; 114-3, a fourth frame memory; and 114-4 a fifth frame memory. These frame memories 114-1 to 114-4 constitute storage means.

Reference numeral 115 denotes a signal processing circuit; 116, an output terminal; 117, a VAP controller; 118, a horizontal VAP actuator; 119, a vertical VAP actuator; and 120, a luminance evaluation circuit.

Figure 4:
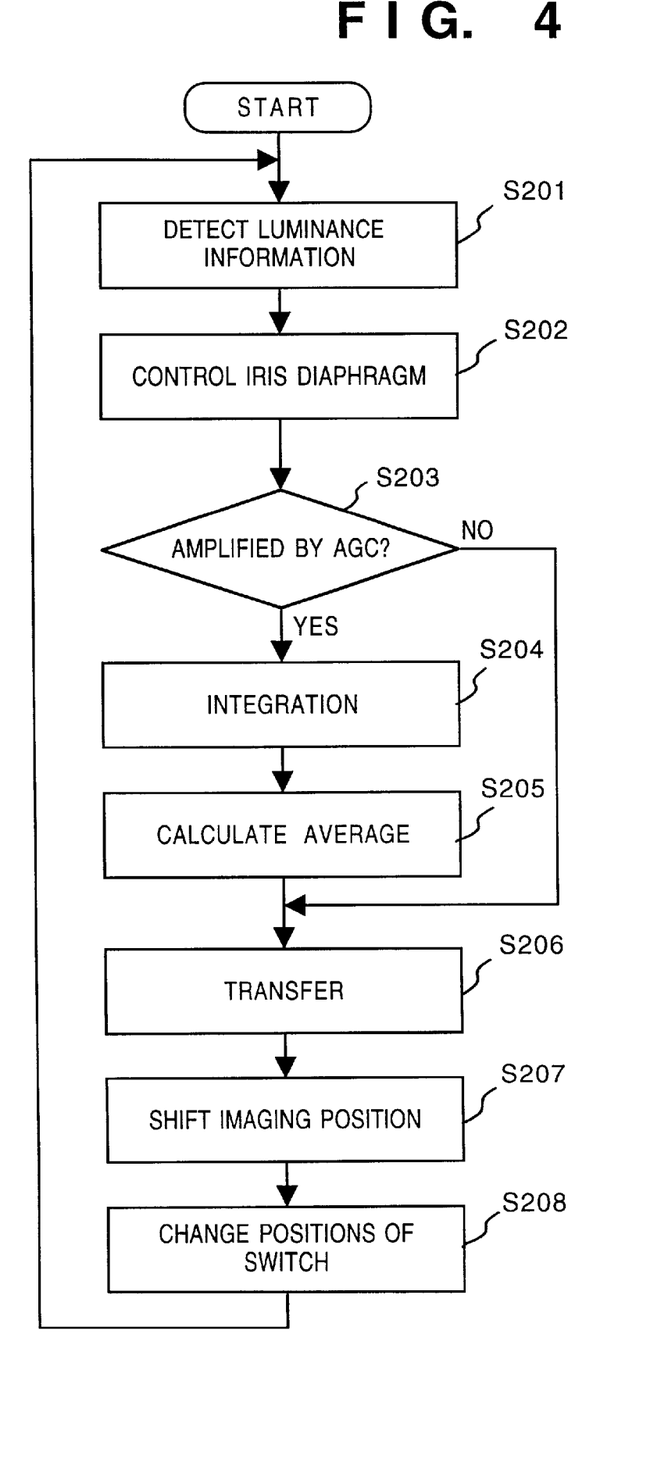
FIG. 4 is a flowchart showing a flow of a control by an MPU according to the second embodiment.

Referring to FIGS. 3 and 4, an operation of the apparatus of the second embodiment will be explained. FIG. 4 is a flowchart showing a flow of the control performed by an MPU. An optical image which is focused on a photo-sensing surface of the CCD 104 through the VAP 101, the iris diaphragm 102, and the focusing lens system 103 is photoelectric-converted. Thereafter, noises of the signal is removed by the correlated double sampling circuit 105, then the signal is amplified with a controlled gain in the AGC 106, and the amplified signal is converted into a digital signal by the A/D converter 107.

In the luminance evaluation circuit 120, luminance information of the optical image incidented on the CCD 104 is evaluated from the digital signal (step S201), then the luminance information is transferred to the MPU 111. The MPU 111 controls the iris diaphragm 2 on the basis of the luminance information (step S202). When a intensity of light which incidents on the CCD 104 is too much, causing the output signal from the CCD 104 to saturate, for example, the intensity of incoming light is properly controlled by the iris diaphragm 102. Whereas, when the intensity of incoming light is not enough even when the iris diaphragm 102 is completely opened, a signal outputted from the CCD 104 is electrically amplified by the AGC 106.

The image signal, converted into a digital signal by the A/D converter 107, is temporally stored in the first frame memory 109 via the adder 108. Basically, the image data stored in the memory 109 is transferred to the switch 113 through the gate circuit 110 and the gain controller 112. However, when the AGC 106 electrically amplifies the image signal, then the MPU 111 opens the gate circuit 110 so as to prevent the signal from being transmitted to the gain controller 112 and its downstream.

At this time, the image data stored in the first frame memory 109 is fed back to the adder 108 where the image data is added with a newly inputted image signal, then the added signal is stored in the first frame memory 109 (step S204). After the aforesaid feed-back process is repeated a predetermined number of times to integrate image signals, the gate circuit 110 is closed so as to transfer the integrated image signal to the gain controller 112. Then, the gain controller 112 divides the transferred image signal by the same number of times as the feed-back operation is repeated so as to obtain the average (step S205), generates an image signal of proper level and sends the generated image signal to the switch 113 (step S206). The image signal can be amplified as in the first embodiment, in such a manner that the gain controller 112 divides the transferred image signal by a less number of times than the number of times that the feed-back operation is repeated. Whereas, when the AGC 106 does not amplify the image signal, the integration process is not performed and the image signal stored in the first frame memory 109 is transferred to the switch 113 without being processed (step S206).

Meanwhile, the VAP controller 117 shifts the imaging position of an optical image on the photo-sensing surface of the CCD 104 to one of four positions on the basis of a command from the MPU 111 (step S207). These four positions are respectively a first position as a reference position, a second position which is shifted from the first position by half pixel in the horizontal direction, a third position which is shifted from the first position by half pixel both in the horizontal and vertical directions, and a fourth position which is shifted from the first position by half pixel in the vertical direction.

Further, the switch 113 has four output terminals, 0, 1, 2, and 3, connected to the memories 114-1 to 114-4, respectively, and controlled so as to switch to one of the four output terminals 0, 1, 2, and 3 in accordance with the aforesaid imaging position (step S208).

In accordance with the aforesaid process for integration and the process of shifting the imaging position, S/N ratio of an image signal from the CCD 104 is improved by the integration process, and an image at the first position is stored in the second frame memory 114-1, an image at the second position is stored in the third frame memory 114-2, an image at the third position is stored in the fourth frame memory 114-3, and an image of the fourth position is stored in the fifth frame memory 114-4, sequentially. Thereafter, the images stored in the four frame memories are read and processed by the signal processing circuit 115, and outputted from the output terminal 116.

In the second embodiment, the VAP is used as means to shift the imaging position on the photo-sensing surface of the CCD, however, the present invention is not limited to this.

If it is assumed that the image sensing apparatus is sensing a still image, an optical image is stable regardless of elapse of time and correlation among image frames are almost 1. In contrast, noises occurred in a solid image sensing element, such as CCD, are random, and correlation among image frames is very low. Therefore, by constructing the image sensing apparatus according to the second embodiment, it is possible to sense an image of good S/N ratio even when the object to be sensed is not illuminated enough, thereby providing a high quality still image.

Third Embodiment

Figure 5:
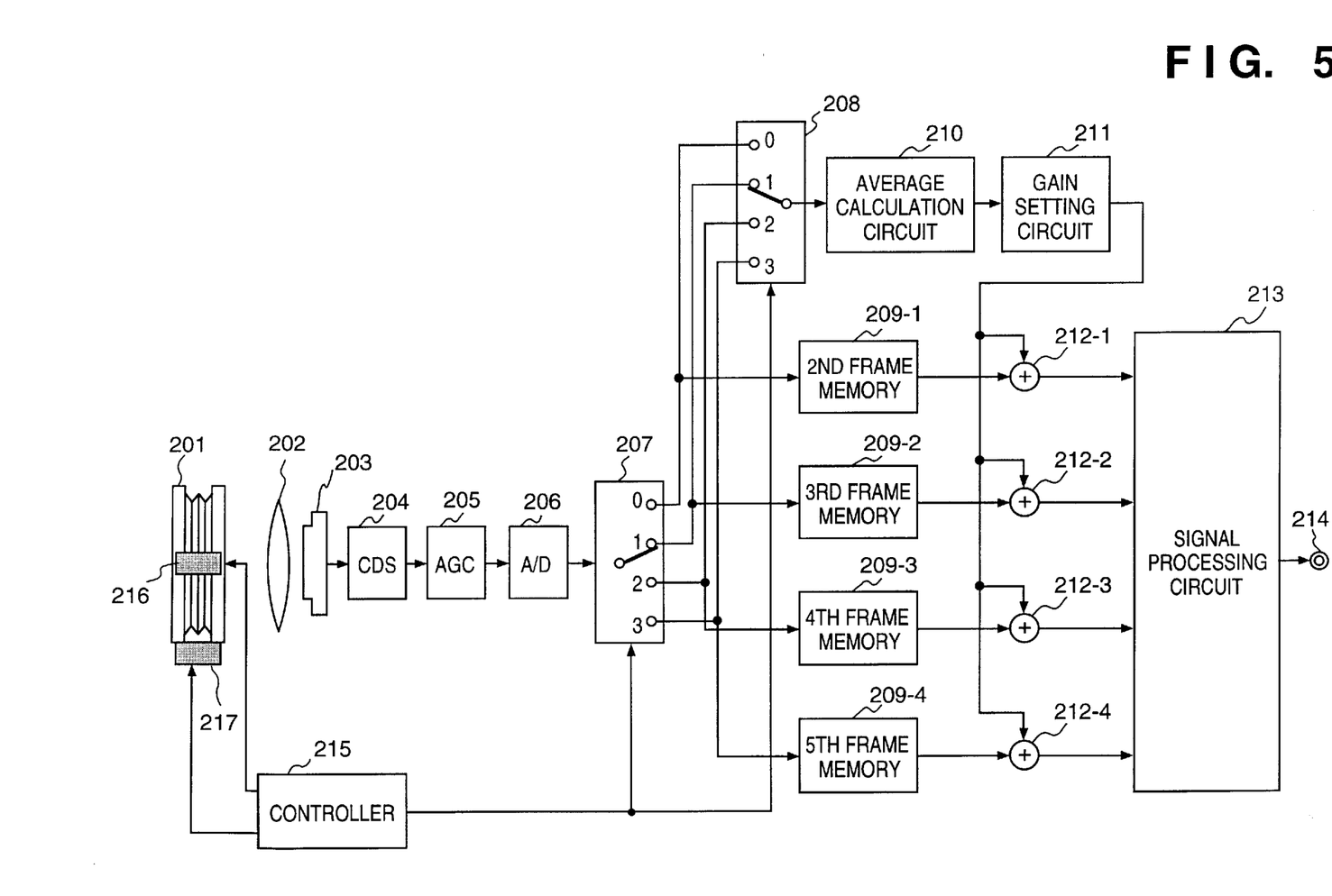
FIG. 5 is a block diagram illustrating a configuration of an image sensing apparatus according to a third embodiment.

FIG. 5 is a block diagram illustrating a configuration of an image sensing apparatus according to a second embodiment. In FIG. 5, reference numeral 201 denotes a variable angle prism (VAP) as means for shifting an imaging position; 202, a focusing lens system as an optical focusing system; 203, a CCD (charge-coupled device) as a photoelectric converter; 204, a correlated double sampling (CDS) circuit; 205, an automatic gain controller (AGC); and 206, an A/D converter.

Further, reference numeral 207 denotes a first switch; 208, a second switch; 209-1, a first frame memory; 209-2, a second frame memory; 209-3, a third frame memory; and 209-4, a fourth frame memory. These frame memories 209-1 to 209-4 constitute storage means.

Furthermore, reference numeral 210 denotes an average calculation circuit as calculating means; 211, a gain setting circuit; 212-1, a first multiplier; 212-2 a second multiplier; 212-3, a third multiplier; and 212-4, a fourth multiplier. The gain setting circuit 211 and the multipliers 212-1 to 212-4 constitute control means. Further, reference numeral 213 denote a signal processing circuit; 214, an output terminal; 215, a controller, 216, a horizontal VAP actuator; and 217, a vertical VAP actuator.

Referring to FIGS. 5, an operation of the apparatus of the third embodiment will be explained. An optical image which is focused on a photo-sensing surface of the CCD 203 through the VAP 201 and the focusing lens system 202 is photoelectric-converted. Thereafter, noises of the signal is removed by the correlated double sampling circuit 204, then the signal is amplified with a controlled gain in the AGC 205, and the amplified signal is converted into a digital signal by the A/D converter 206. Then the digital signal is inputted into the first switch 207. The first switch 207 has four output terminals, 0, 1, 2, and 3, connected to the memories 209-1 to 209-4, respectively. Further the four output terminals 0 to 3 are also respectively connected to input terminals 0 to 3 of the second switch 208. An output from the second switch 208 is inputted into the average calculation circuit 210.

The controller 215 sequentially shifts an imaging position from a first position as a reference position, then to a second position which is shifted from the first position by half pixel in the horizontal direction, then to a third position which is shifted from the first position by half pixel both in the horizontal and vertical directions, then to a fourth position which is shifted from the first position by half pixel in the vertical direction. At the same time, the first switch 207 and the second switch 208 are controlled so as to switch to one of the four output terminals 0, 1, 2, and 3 in accordance with the aforesaid imaging position.

In accordance with the aforesaid process, an image signal from the CCD 203 has its noises reduced, amplified by a controlled gain, and converted into a digital signal, then an image at the first position is stored in the first frame memory 209-1, an image at the second position is stored in the second frame memory 209-2, an image at the third position is stored in the third frame memory 209-3, and an image of the fourth position is stored in the fourth frame memory 209-4, sequentially.

Meanwhile, the average calculation circuit 210 calculates an average level of the digital image signal inputted through the second switch 208. If the signals from the CCD 203 includes a color carrier component of a complementary color mosaic, for example, the average of the signals shows a luminance level. Therefore, an output from the average calculation circuit 210 represents a luminance level of a sensed image of each frame. The gain setting circuit 211 determines a gain for each frame based on the calculated luminance level, and the multipliers 212-1 to 212-4 respectively multiply the digital image signals stored in memories 209-1 to 209-4 by the corresponding gains. Then, the image signals are read and processed in the signal processing circuit 213, and outputted from the output terminal 214.

Accordingly, the digital image signals for four frames inputted into the signal processing circuit 213 are to have similar luminance levels. Therefore, even if the brightness the object is changed during sensing the image of the object, the quality of the image processed in the signal processing circuit 213 can be maintained.

It should be noted that, the AGC circuit 205 roughly controls the gain when a large gain is necessarily applied to an image signal in a case where an object to be sensed is not illuminated enough, and it can not control luminance levels of image signals to precisely the same level. Also note that the VAP is used as means to change the imaging position, however, the present invention is not limited to this.

The present invention can be applied to a system constituted by a plurality of devices or to an apparatus comprising a single device.

The present invention is not limited to the above embodiments and various changes and modifications can be made within the spirit and scope of the present invention. Therefore to appraise the public of the scope of the present invention, the following claims are made.

What is claimed is:

1. An image sensing apparatus which outputs an image signal, comprising
    optical focusing system for focusing the optical image on a photo-sensing surface;
    photoelectric conversion means for photoelectrically converting the optical image focused on said photo-sensing surface so as to generate an electric signal;
    first detecting means for detecting a level of an output of said photoelectric conversion means;
    exposure control means for controlling an exposure condition for said photoelectric conversion means in accordance with an output of said first detecting means;
    integration means for integrating the electric signal with respect to time;
    second detecting means for detecting a level of an output of said integration means;
    integration control means for continuing an operation of integration performed by said integration means until the second detecting means detects that the level of the output of said integration means is greater or equal to a predermined value; and
    output means for generating the image signal on the basis of the integrated electric signal and outputting it.

2. The image sensing apparatus according to claim 1 wherein said integration control means controls said integration means to continue integrating the electric signal until a luminance level of an integrated electric signal reaches a predetermined level.

3. The image sensing apparatus according to claim 2 further comprising imaging position shifting means for sequentially focusing a plurality of positions of the optical image on said photo-sensing surface, wherein said photoelectric conversion means generates an electric signal of the optical image focused on each of said plurality of imaging positions.

4. The image sensing apparatus according to claim 3, further comprising:
    storage means for storing integrated electric signals, integrated by said integration means, each of which corresponding to said plurality of positions of an optical image focused on the photo-sensing surface; and
    processing means for reading out and processing the electric signals stored in said storage means.

5. The image sensing apparatus according to claim 4, wherein said photoelectric conversion means comprises a charge-coupled device.

6. The image sensing apparatus according to claim 4, wherein said imaging position shifting means comprises a variable angle prism.

7. The image sensing apparatus according to claim 1, further comprising imaging position shifting means for sequentially focusing a plurality of positions of the optical image on said photo-sensing surface, wherein said photoelectric conversion means generates an electric signal of the optical image focused on each of said plurality of imaging positions.

8. The image sensing apparatus according to claim 7, further comprising:
    storage means for storing integrated electric signals, integrated by said integration means, each of which corresponding to said plurality of positions of an optical image focused on the photo-sensing surface; and
    processing means for reading out and processing the electric signals stored in said storage means.

9. The image sensing apparatus according to claim 1, frther comprising operation means for dividing a value of the integrated electrical signal by a predetermined number.

10. The image sensing apparatus according to claim 9, wherein said integration means adds electrical signals a predetermined number of times.

11. The image sensing apparatus according to claim 10, wherein said operation means divides a value of an integrated electrical signal by the predetermined number.

12. The image sensing apparatus according to claim 9, further comprising amplifying means for amplifying an electric signal, generated by performing photoelectric conversion to a predetermined level, wherein said integration means integrates an electric signal amplified by said amplifying means.

13. The image sensing apparatus according to claim 12, wherein said integration means adds electric signals a predetermined number of times.

14. The image sensing apparatus according to claim 13, wherein said operation means divides a value of an integrated electric signal by the predetermined number.

15. The image sensing apparatus according to claim 9, further comprising imaging position shifting means for sequentially focusing a plurality of positions of the optical image on said photo-sensing surface, wherein said photoelectric conversion means generates an electric signal of the optical image focused on each of said plurality of imaging positions.

16. The image sensing apparatus according to claim 15, further comprising:
    storage means for storing integrated electric signals, integrated by said integration means, each of which corresponding to said plurality of positions of an optical image focused on the photo-sensing surface; and
    processing means for reading out and processing the electric signals stored in said storage means.

17. The image sensing apparatus according to claim 16, wherein said integration means adds electric signals a predetermined number of times.

18. The image sensing apparatus according to claim 17, wherein said operation means divides a value of an integrated electric signal by the predetermined number.

19. The image sensing apparatus according to claim 17, wherein said photoelectric conversion means comprises a charge-coupled device.

20. The image sensing apparatus according to claim 17, wherein said imaging position shifting means comprises a variable angle prism.

21. An image sensing apparatus which outputs an image signal, comprising:
    optical focusing system for focusing the optical image on a photo-sensing surface;
    photoelectric conversion means for photoelectrically converting the optical image focused on said photo-sensing surface so as to generate an electric signal;
    first detecting means for detecting a level of an output of said photoelectric conversion means;
    exposure control means for controlling an exposure condition for said photoelectric conversion means in accordance with an output of said first detecting means;

integration means for integrating the electric signal with respect to time;

second detecting means for detecting a condition where an integrated electric signal outputted from said integration means is greate than or equal to a predetermined value;

integration control means for controlling said integration means to continue integrating the electric signal until said second detecting means detects that the integrated electric signal is greater than or equal to the predetermined value; and output means for generating the image signal on the basis of the integrated electric signal and outputting it.

22. The image sensing apparatus according to claim 21, further comprising imaging position shifting means for sequentially focusing a plurality of positions of the optical image on said photo-sensing surface, wherein said photoelectric conversion means generates an electric signal of the optical image focused on each of said plurality of imaging positions.

23. The image sensing apparatus according to claim 22, further comprising:

storage means for storing integrated electric signals, integrated by said integration means, each of which corresponding to said plurality of positions of an optical image focused on the photo-sensing surface; and processing means for reading out and processing the electric signals stored in said storage means.

24. The image sensing apparatus according to claim 23, wherein said photoelectric conversion means comprises a charge-coupled device.

25. The image sensing apparatus according to claim 23, wherein said imaging position shifting means comprises a variable angle prism.

\* \* \* \* \*

UNITED STATES PATENT AND TRADEMARK OFFICE
CERTIFICATE OF CORRECTION

PATENT NO. : 5,926,216
DATED : July 20, 1999
INVENTOR(S) : Kosuke Nobuoke

It is certified that error appears in the above-identified patent and that said Letters Patent is hereby corrected as shown below:

Column 1, line 28, please delete "," after using.

In the claims:
Claim 1, column 9, line 13, after "comprising" insert --.--.

Claim 21, column 11, line 5, delete "greate" and insert therefor --greater--.

Signed and Sealed this

Twenty-seventh Day of February, 2001

Attest:

NICHOLAS P. GODICI

Attesting Officer        Acting Director of the United States Patent and Trademark Office